United States Patent [19]

Nagata et al.

[11] Patent Number: 4,929,707

[45] Date of Patent: May 29, 1990

[54] POLYURETHANE BASE LENS RESIN, PLASTIC LENS COMPRISING THE RESIN AND PREPARATION METHOD OF THE LENS

[75] Inventors: Teruyuki Nagata; Koju Okazaki, both of Fukuoka; Nobuyuki Kajimoto, Kanagawa; Tohru Miura, Kanagawa; Yoshinobu Kanemura, Kanagawa; Katsuyoshi Sasagawa, Kanagawa, all of Japan

[73] Assignee: Mitsui Toatsu Chemicals, Inc., Tokyo, Japan

[21] Appl. No.: 305,905

[22] Filed: Feb. 3, 1989

[30] Foreign Application Priority Data

Feb. 16, 1988 [JP] Japan .................................. 63-31788
Feb. 22, 1988 [JP] Japan .................................. 63-37514

[51] Int. Cl.$^5$ ............................................. C08G 18/38
[52] U.S. Cl. ....................................... 528/76; 528/77; 528/79; 528/85
[58] Field of Search ....................... 528/76, 77, 79, 85

[56] References Cited

U.S. PATENT DOCUMENTS 4,775,733 10/1988 Kanemura et al. ................... 528/67

Primary Examiner—Maurice J. Welsh
Attorney, Agent, or Firm—Burns, Doane, Swecker & Mathis

[57] ABSTRACT

Polyurethane base lens resins obtained by reacting one or more of sulfur-containing polyisocyanates compound with one or more of sulfur-containing polyols, and polyurethane base lenses comprising these resins are disclosed.

A method for preparing polyurethane base lenses which comprises adding internal mold releasing agents to the mixture of the above polyisocyanates and polyols prior to casting polymerization is also disclosed.

27 Claims, No Drawings

POLYURETHANE BASE LENS RESIN, PLASTIC LENS COMPRISING THE RESIN AND PREPARATION METHOD OF THE LENS

BACKGROUND OF THE INVENTION

1. Field of the Invention

The present invention relates to a polyurethane base lens resin, polyurethane base lens and processes for preparing the same. Plastic lenses have been rapidly popularized in recent years for optical elements such as lenses of eyeglasses and cameras. Plastic lenses are lightweight, are less fragile than inorganic lenses and are capable of being dyed with ease.

2. Description of the Prior Art

An example of a resin presently widely used for such lenses is a radical polymerization product of diethylene glycol bisallyl carbonate (hereinafter abbreviated as DAC). The resin has excellent impact resistance, is lightweight, has prominent dye-affinity and good machinability including cutting ability and polishing ability.

However, lenses prepared from the resin have a smaller refractive index ($n_D = 1.50$) than inorganic lenses ($n_D = 1.52$). In order to obtain equivalent optical properties to glass lenses, it is necessary to increase the center thickness, peripheral thickness and curvature of the lens and hence the lens as a whole becomes inevitably thick. Therefore, resins providing a higher refractive index are desired.

Other resins that have been known to provide plastic lenses having high refractive indexes are polyurethane base resins obtained by the reaction of isocyanate compounds with hydroxyl compounds such as diethylene glycol (disclosed in Japanese Patent Laid-Open No. 136601/1982, U.S. Pat. No. 4443588), with halogen containing hydroxyl compounds such as tetrabromobisphenol-A (Japanese Patent Laid-Open No. 164615/1983), with sulfur containing hydroxyl compounds (Japanese Patent Laid-Open Nos. 194401/1985 and 217229/1985, U.S. Pat. No. 4680369, U.S. Pat. No. 4780522), and with polythiol compounds (Japanese Patent Laid-Open Nos. 199016/1985 and 267316/1987, U.S. Pat. No. 4689387).

The lenses prepared from these resins, however, are still exhibit unsatisfactory refractive indexes, although the indexes of these lenses are better than that of a lens prepared from DAC. Further, since these resins are prepared from compounds containing many halogen atoms or aromatic rings in a molecule to improve the refractive index, lenses obtained from these resins have disadvantages such as large dispersion of refractive index, poor weatherability and high specific gravity.

In molding the polyurethane base lens, it is usually difficult to release the polymerized lens from the mold due to good adhesion between the polyurethane compounds and the mold. In order to improve the mold releasing property, the present inventors have previously proposed a method for using external mold releasing agents (Japanese Patent Laid-Open No. 267316/1987) and a method for applying polyolefin resin molds (Japanese Patent Laid-Open No. 236818/1987).

The above methods, however, are still insufficient for improving the mold releasing property in the casting polymerization of the polyurethane base lens.

When external mold releasing agents are used, a portion of the agents used for treating the inner surface of the mold migrates to the surface and interior of the polymerized lens which results in problems such as nonuniformity of the surface of the lens and turbidity. When a mold is used repeatedly, mold releasing treatment is required in each molding cycle. Such treatment lowers productivity in producing the lens and thus is extremely uneconomical in industrial production.

When the polyolefin resin molds are applied, the resin molds are deformed at elevated temperatures which causes large profile irregularities on the molded lens. Therefore it was found that the resin molds could not be applied to articles requiring high accuracy on the molded surface.

An example of the use of internal mold releasing agents to improve releasing property of molded materials, is a method for incorporating butyl phosphate in DAC. However the internal mold releasing agents cause adverse effect on the appearance of molded articles [S. Mima, Polymer Digest, 3, 39 (1984)], and hence have not been positively used.

SUMMARY OF THE INVENTION

The present invention overcomes the problems and disadvantages of the prior art by providing a polyurethane base resin having improved properties over prior art resins, a process for producing the same, and a lens containing the resin having superior properties over prior art lenses and a method of producing the same.

An object of this invention is to provide a colorless and transparent polyurethane base resin having a high refractive index and low dispersion of refractive index which is suitable for use in producing a lens which is lightweight, and is excellent in weatherability and impact resistance.

Another object of this invention is to provide a polyurethane base lens having high accuracy in the profile of surface and excellent optical properties and a process for producing the same which does not include specific release treatment of the inner mold surface of the mold used to make the lens.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention comprises a process for producing a polyurethane base resin useful for making lenses comprising reacting one or more of sulfur-containing polyisocyanate compounds with one or more of sulfur-containing polyol compounds, and a lens comprising the resin.

The invention also provides a process for producing a polyurethane base lens comprising adding an internal mold releasing agent to a mixture of one or more of sulfur-containing polyisocyanate compounds and one or more of sulfur-containing polyol compounds and then cast polymerizing the mixture to form a lens and a lens produced by this process.

The polyurethane base resin of the invention is colorless, transparent, has a high refractive index and low dispersion of refractive index and is particularly suitable for producing lenses.

The polyurethane base lens of the invention is excellent in weatherability, is lightweight and exhibits excellent impact resistance. The lens has excellent optical properties and is very accurate in the profile of the surface.

DETAILED DESCRIPTION OF THE INVENTION

Reference will now be in detail to the present preferred embodiments of the invention.

Exemplary suitable compounds for use as the sulfur-containing polyisocyanate compound in the processes of the present invention includes, sulfur containing aliphatic polyisocyanates such as thiodiethyl diisocyanate, thiodipropyl diisocyanate, thiodihexyl diisocyanate, dimethyl sulfone diisocyanate, dithiodimethyl diisocyanate, dithiodiethyl diisocyanate, and dithiodipropyl diisocyanate; sulfide linkage containing aromatic polyisocyanates such as diphenylsulfide-2,4'-diisocyanate, diphenylsulfide-4,4'-diisocyanate, 3,3'-dimethoxy-4,4'-diisocyanatodibenzyl thioether, bis(4-isocyanatomethylphenyl) sulfide, and 4,4'-methoxyphenylthioethyleneglycol3,3'-diisocyanate; disulfide linkage containing aromatic polyisocyanates such as diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate, and 4,4'-dimethoxydiphenyldisulfide-3,3'-diisocyanate; sulfone linkage containing aromatic polyisocyanates such as diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylsulfone-2,4'-diisocyanate, 4,4'-dimethoxydiphenylsulfone-3,3'-diisocyanate, 3,3'-dimethoxy-4,4'-diisocyanatodibenzyl sulfone, 4,4'-dimethyldiphenylsulfone-3,3'-diisocyanate, 4,4'-di-tert-butyldiphenylsulfone-3,3'-diisocyanate, 4,4'-methoxyphenylethylenedisulfone-3,3'-diisocyanate, and 4,4'-dichlorodiphenylsulfone-3,3'-diisocyanate; sulfonic acid ester linkage containing aromatic polyisocyanates such as 4-methyl-3-isocyanatophenylsulfonyl-4'-isocyanatophenol ester and 4-methoxy-3-isocyanatophenylsulfonyl-4'-isocyanatophenol ester; sulfonamide linkage containing aromatic polyisocyanates such as 4-methyl-3-isocyanatophenylsulfonylanilide-3'-methyl-4'-isocyanate, diphenylsulfonylethylenediamine-4,4'-diisocyanate, 4,4'-methoxyphenylsulfonylethylenediamine-3,3'-diisocyanate, and 4-methyl-3-isocyanatophenylsulfonylanilide-4-methyl-3'-isocyanate; sulfer containing heterocyclic compounds such as thiophene-2,5-diisocyanate; and 1,4-dithian-2,5-diisocyanate.

Exemplary suitable derivatives of the above polyisocyanate compounds for use in the invention include halogenated compounds such as chlorinated isocyanates and brominated isocyanates, biuret reaction products, addition products with trimethylolpropane, dimerization products and trimerization products.

Preferably, polyisocyanate compounds that are liquid and have a low vapor pressure at room temperature are employed. Sulfur-containing aliphatic polyisocyanate is favorable in view of yellowing by heat and light. The polyisocyanate compounds may be used singly or in combination.

Exemplary suitable polyol compounds for use in the processes of the invention include aliphatic polyols having diphenyl-sulfide skeletons such as bis[4-(hydroxyethoxy)phenyl] sulfide, bis[4-(2-hydroxypropoxy)phenyl] sulfide, bis[4-(2,3-dihydroxypropoxy)phenyl] sulfide, bis[4-(4-hydroxycyclohexyloxy)phenyl] sulfide, and bis[2-methyl-4-(hydroxyethoxy)-6-butylphenyl] sulfide; compounds obtained by the addition of ethylene oxide and/or propylene oxide to the above polyols in amount of not more than 3 moles in average per mole of hydroxyl group of the polyols; sulfide linkage containing aliphatic polyols such as bis(2-hydroxyethyl)sulfide, 1,2-bis[2-hydroxyethylmercapto)ethane, 1,4-dithian-2,5-diol, bis(2,3-dihydroxypropyl) sulfide, tetrakis(4-hydroxy-2-thiabutyl)methane, and 1,3-bis(2-hydroxyethylthioethyl)cyclohexane; disulfide linkage containing aliphatic polyols such as bis(2-hydroxyethyl) disulfide and bis(2,3-dihydroxypropyl) disulfide; and phenolic hydroxyl group and sulfur containing polyols such as bis(4-hydroxyphenyl) sulfone (Trade Mark, Bisphenol-S),tetrabromobisphenol-S, tetramathylbisphenol-S, and 4,4'-thiobis(6-tert-butyl-3-methylphenol).

Exemplary suitable halogenated derivatives for use in the invention include chlorinated sulfur-containing polyol and brominated sulfur-containing polyol may also be used. The sulfur-containing polyol may be used singly or in combination as a mixture.

The sulfur-containing polyisocyanate compounds and the sulfur-containing polyol compounds are employed in amount of from about 0.5 to 3.0 moles of functional isocyanate group per mole of hydroxyl group, preferably from about 0.5 to 1.5 moles of functional isocyanate per mole of hydroxyl group.

The plastic lens of this invention contains the polyurethane resin of the invention which contains urethane linkages derived from isocyanate groups and hydroxyl groups. Allophanate, urea, biuret and other linkages may, of course, be contained in the resin and lens in addition to the urethane linkages depending upon the desired properties.

For example, when cross linking density is increased by further reacting the urethane linkages with isocyanate groups, favorable results can often be obtained. In this case, the reaction is carried out at temperatures higher than 100° C. in the presence of excess polyisocyanate components. Alternatively, urea and/or biuret linkages may also be introduced by simultaneously using a small amount of amine compounds or the like. When polyisocyanate reactive compounds are used in addition to the polyol, coloration must be considered.

Various additives such as chain extending agents, cross linking agents, light stabilizers, ultraviolet absorbers, antioxidants, oil soluble dyestuffs and fillers may be incorporated to achieve particular desired properties.

Known catalysts which are used for the preparation of polyurethane may also be used, if necessary, in order to adjust reaction rate in the desired range.

The lens resin and the lens of this invention can usually be prepared by the casting polymerization. The sulfur-containing polyisocyanate compound is mixed with the sulfur-containing polyol. The resultant mixture is deaerated if necessary, and then poured into a mold and polymerized.

A lens prepared from the polyurethane base resin of this invention can be imparted with the following properties, antireflection, surface hardness, abrasion resistance, chemical resistance, fog resistance and fashionability by subjecting the lens to physical or chemical treatments such as surface polishing, antistatic treatment, hard coating, antireflection coating, dyeing and dimming.

Applicants have found that incorporation of the internal mold releasing agent into the mixture of polyisocyanate and polyol prior to carrying out casting polymerization results in easier and better mold release of the polymerized lens.

Exemplary suitable compounds for use as an internal mold releasing agent in this invention include fluorine containing nonionic surface active agents, silicon containing nonionic surface active agents, alkyl quaternary ammonium salts, acid phosphate esters, liquid paraffin, waxes, higher fatty acids and their salts, higher fatty acid esters, higher aliphatic alcohols, bisamides, polysiloxanes, and adducts of ethylene oxide to aliphatic amines.

The internal mold releasing agent is suitably selected on the basis of monomer combination, polymerization conditions, economy and readiness in handling. The agent may be used singly or as a mixture of two or more such agents.

Examplary suitable fluorine containing nonionic surface active agents and silicon containing nonionic surface active agents which are used in this invention include compounds containing perfluoroalkyl groups or dimethyl polysiloxane groups in their molecules and also containing hydroxyalkyl groups or phosphate ester groups. Exemplary suitable fluorine containing nonionic surface active agents include Unidain TM : DS-401 and DS-403 (Products of Daikin Kogyo Co., Ltd.) and F-Top TM ; EF-122A, EF-126 and EF-301 (Products of Shin-Akita Chemical Co., Ltd.). An exemplary suitable silicon containing nonionic surface active agent is a trial product Q2-120A of Dow Chemical Co.

Exemplary suitable alkyl quaternary ammonium salts for use in this invention include cationic surface active agents such as alkyl quaternary ammonium halogenides, phosphates and sulfates such as trimethylcetyl ammonium chloride, trimethylstearyl ammonium chloride, dimethylethylcetyl ammonium chloride, triethyldodecyl ammonium chloride, trioctylmethyl ammonium chloride, and diethylcyclohexyldodecyl ammonium chloride.

Exemplary suitable acid phosphate esters for use in this invention include isopropyl acid phosphate, diisopropyl acid phosphate, butyl acid phosphate, dibutyl acid phosphate, octyl acid phosphate, dioctyl acid phosphate, isodecyl acid phosphate, diisodecyl acid phosphate, tridecanol acid phosphate, and bis(tridecanol acid)phosphate.

Examplary suitable metal salts of higher fatty acid for use in this invention include zinc, calcium, magnesium, nickel and copper salts of stearic acid, oleic acid, octanoic acid, lauric acid, behenic acid and ricinoleic acid such as zinc stearate, zinc oleate, zinc palmitate, zinc laurate, calcium stearate, calcium oleate, calcium palmitate, calcium laurate, magnesium stearate, magnesium oleate, magnesium laurate, magnesium palmitate, nickel stearate, nickel oleate, nickel palmitate, nickel laurate, copper stearate, copper oleate, copper laurate, and copper palmitate.

Exemplary suitable higher fatty acid esters for use in this invention include esters obtained by the reaction of higher fatty acids such as stearic acid, oleic acid, octanoic acid, lauric acid and ricinolic acid with alcohols such as ethylene glycol, propylene glycol, butane diol, neopentyl glycol and hexane diol.

The internal mold releasing agent may be used singly or in combination. The total amount of the releasing agents used is from about 0.1 to about 10,000 ppm preferably from about 1 to about 5,000 ppm per sum of the polyisocyanate and polyol. When used in an amount less than 0.1 ppm, demolding ability becomes poor. When used in an amount greater than 10,000 ppm, the molded lens causes haze. The excess amount also results in poor profile accuracy of the lens surface due to premature release of the molded lens from the mold surface during polymerization.

Although the temperature and time of polymerization are different depending upon the type of monomer and additives such as mold releasing agent, the polymerization is carried out for from about 0.5 to about 72 hours at a temperature usually from about $-20°$ C. to about 200° C., preferably from room temperature to about 150° C., and more preferably from about 50° C. to about 120° C.

Annealing of the polymerized lens may be conducted when necessary.

The polyurethane base lens thus obtained in this invention has a high profile accuracy of the molded surface and excellent optical properties and is lightweighted, excellent in impact resistance and suitable for use as eyeglass lenses and camera lenses.

EXAMPLE

This invention will hereinafter be illustrated by way of the following examples and comparative examples, which are intended to be purely exemplary of the invention. In testing properties of the lens resin obtained, refractive index, Abbe's number, weatherability, mold release property and appearance were measured by the following methods.

Refractive index and Abbe's number:
Measured at 20° C. with a Pulfrich refractometer.
Weatherability:
A lens resin was set in a weatherometer equipped with a sunshine carbon arc lamp. The lens was taken out after 200 hours and its hue was compared with that of a lens resin before the test. Evaluation was classified into no change (O), slight yellowing (Δ), and yellowing (X).
Mold release property:
After completing the polymerization, a teflon wedge was struck in the interface of the lens and glass mold. The results were divided into the following two classes.
O Quite readily released.
X Release was partly or wholly impossible.
Appearance:
Evaluation was conducted by visual observation.

EXAMPLE-1A

A mixture of 15.0 g (0.04 mole) of tetrakis(4-hydroxy-2-thiabutyl)methane and 13.8 g (0.08 mole) of thiodiethyl diisocyanate was prepared and poured into a mold consisting of a glass mold and a gasket. The mold was then gradually heated from room temperature to 120° C. taking 48 hours to complete the polymerization. The lens thus obtained was colorless, transparent and excellent in weatherability. The lens had a refractive index $n_D^{20}$ of 1.59, Abbe's number $\nu^{20}$ of 45 and a density $d^{20}$ of 1.36.

EXAMPLES 2A-13A AND COMPARATIVE EXAMPLES 1A-3A

The same procedures as described in Example 1A were carried out for preparing lenses by using the composition illustrated in Table 1.

Results of testing physical properties are summarized in Table 1.

EXAMPLE 1B

A mixture of 13.8 g (0.08 mole) of thiodiethyl diisocyanate, 15.0 g (0.04 mole) of tetrakis(4-hydroxy-2-thiabutyl)methane and 0.003 g of Unidain ™ DS-401 (internal mold releasing agent, product of Daikin Kogyo Co., Ltd.) was prepared and poured into a mold consisting of a glass mold and a gasket. Then the mold was gradually heated from room temperature to 120° C. and taking 24 hours to complete the polymerization. After completing the polymerization, the lens was readily released from the mold. The lens obtained was colorless and transparent, and had a refractive index of $n_D^{20}$ of 1.59, Abbe's number $\nu^{20}$ of 45 and a density of 1.36.

EXAMPLES 2B-17B

The same procedures as described in Example 1B were carried out for preparing lenses by using the compositions illustrated in Table 2. Results on the physical property test are illustrated in Table 2.

COMPARATIVE EXAMPLES 1B-8B

The same procedures as described in Example 1B were carried out for preparing lenses except that molds were used under conditions described below and compositions set forth in Table 3 were used. The results are summarized in Table 3.

The descriptions in the mold treatment column in Table 3 also indicates the following conditions.

(1) No treatment . . . A glass mold was used without any releasing treatment.

(2) External releasing treatment . . . External mold releasing agent YSR-6209 ™ (product of Toshiba Silicon Co.) was applied and backed on the inner surface of a glass mold.

(3) Recycled use . . . The glass mold obtained by the external releasing treatment was once employed for the polymerization and then used again without any further treatment.

(4) PP-mold . . . A polypropylene mold was prepared by injection molding and used in place of the glass mold without any surface treatment.

TABLE 1

| | Polyisocyanate (amount) | Polyol (amount) | Refractive index | Abbe's number | Weather-ability | Appearance |
|---|---|---|---|---|---|---|
| Example-2A | $(SCH_2CH_2NCO)_2$ (0.08 mol) | $C(CH_2SCH_2CH_2OH)_4$ (0.04 mol) | 1.61 | 42 | | Colorless Transparent |
| Example-3A | $(SCH_2CH_2CH_2NCO)_2$ (0.08 mol) | $C(CH_2SCH_2CH_2OH)_4$ (0.04 mol) | 1.60 | 43 | | Colorless Transparent |
| Example-4A | $(SCH_2CH_2CH_2NCO)_2$ (0.08 mol) | $S(CH_2CHCH_2OH)_2$ —OH (0.08 mol) | 158 | 47 | | Colorless Transparent |
| Example-5A | $S(CH_2CH_2NCO)_2$ (0.04 mol) $S(CH_2CH_2NCO)_2$ (0.04 mol) | $C(CH_2SCH_2CH_2OH)_4$ (0.04 mol) | 1.60 | 43 | | Colorless Transparent |
| Example-6A | $S(CH_2CH_2NCO)_2$ (0.08 mol) | $C(CH_2SCH_2CH_2OH)_4$ (0.02 mol) $S(CH_2CHCH_2OH)_2$ —OH (0.02 mol) | 1.59 | 46 | | Colorless Transparent |
| Example-7A | $S(CH_2CH_2NCO)_2$ (0.04 mol) $(SCH_2CH_2NCO)_2$ (0.04 mol) | $C(CH_2SCH_2CH_2OH)_4$ (0.02 mol) $S(CH_2CHCH_2OH)_2$ —OH (0.02 mol) | 1.60 | 44 | | Colorless Transparent |
| Example-8A | OCN—⟨⟩—S—⟨⟩—NCO (0.01 mol) $S(CH_2CH_2NCO)_2$ (0.03 mol) | HOCH₂CH₂O—⟨⟩—(S—⟨⟩)₂ (0.04 mol) | 1.62 | 35 | | Colorless Transparent |
| Example-9A | OCN—⟨⟩—S—S—⟨⟩—NCO (0.01 mol) $S(CH_2CH_2NCO)_2$ (0.03 mol) | HO—⟨⟩—S(=O)(=O)—⟨⟩—OH (0.01 mol) $S(CH_2CH_2OH)_2$ (0.03 mol) | 1.61 | 34 | | Colorless Transparent |

TABLE 1-continued

| | Polyisocyanate (amount) | Polyol (amount) | Refractive index | Abbe's number | Weather-ability | Appearance |
|---|---|---|---|---|---|---|
| Example-10A | 4,4'-diisocyanatodiphenylsulfone [OCN-C$_6$H$_4$-SO$_2$-C$_6$H$_4$-NCO] (0.01 mol)<br>S(CH$_2$CH$_2$NCO)$_2$ (0.07 mol) | C(CH$_2$SCH$_2$CH$_2$OH)$_4$ (0.04 mol) | 1.62 | 37 | | Colorless Transparent |
| Example-11A | bis(4-isocyanato-3-methylphenyl)sulfonate [Me-C$_6$H$_3$(NCO)-SO$_2$-O-C$_6$H$_4$-NCN] (0.01 mol)<br>S(CH$_2$CH$_2$NCO)$_2$ (0.07 mol) | C(CH$_2$SCH$_2$CH$_2$OH)$_4$ (0.04 mol) | 1.62 | 36 | | Colorless Transparent |
| Example-12A | bis(4-isocyanato-3-methylphenyl)sulfamate [Me-C$_6$H$_3$(NCO)-SO$_2$-NH-C$_6$H$_3$(Me)-NCO] (0.01 mol)<br>S(CH$_2$CH$_2$NCO)$_2$ (0.07 mol) | C(CH$_2$SCH$_2$CH$_2$OH)$_4$ (0.02 mol)<br>S(CH$_2$CHCH$_2$OH)$_2$<br>   $\|$<br>   OH<br>(0.02 mol) | 1.60 | 38 | | Colorless Transparent |
| Example-13A | 2,5-diisocyanatothiophene (0.06 mol) | C(CH$_2$SCH$_2$CH$_2$OH)$_4$ (0.02 mol)<br>S(CH$_2$CH$_2$OH)$_2$ (0.02 mol) | 1.61 | 36 | | Colorless Transparent |
| Comparat. Example-1A | (CH$_2$CH$_2$CH$_2$NCO)$_2$ (0.07 mol) | HOCH$_2$CH$_2$CH$_2$OH (0.07 mol) | 1.50 | 55 | | Colorless Transparent |

TABLE 1-continued
| | Polyisocyanate (amount) | Polyol (amount) | Refractive index | Abbe's number | Weather-ability | Appearance |
|---|---|---|---|---|---|---|
| Comparat. Example -2A | (CH$_2$CH$_2$CH$_2$NCO)$_2$ (0.05 mol) | 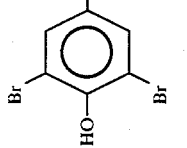 (0.033 mol) | 1.66 | 27 | | Colorless Transparent |
| Comparat. Example -3A | 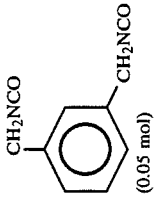 (0.05 mol) | 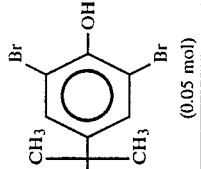 (0.05 mol) | 1.61 | 27 | Δ | Slight discoloration Transparent |

TABLE 2

| | Polyisocyanate (amount) | Polyol (amount) | Internal releasing agent (amount) | Mold release | Appearance | Refractive index | Abbe's number |
|---|---|---|---|---|---|---|---|
| Example −2B | $S(CH_2CH_2NCO)_2$ (0.08 mol) | $C(CH_2SCH_2CH_2OH)_4$ (0.04 mol) | Q2-120A (Dow Chem.) (150 ppm) | | Good surface accuracy Colorless Transparent | 1.59 | 45 |
| Example −3B | $S(CH_2CH_2NCO)_2$ (0.08 mol) | $C(CH_2SCH_2CH_2OH)_4$ (0.04 mol) | Trimethylcetyl ammonium chloride (500 ppm) | | Good surface accuracy Colorless Transparent | " | " |
| Example −4B | $S(CH_2CH_2NCO)_2$ (0.08 mol) | $C(CH_2SCH_2CH_2OH)_4$ (0.04 mol) | Diisopropyl acid phosphate (500 ppm) | | Good surface accuracy Colorless Transparent | " | " |
| Example −5B | $(SCH_2CH_2NCO)_2$ (0.08 mol) | $C(CH_2SCH_2CH_2OH)_4$ (0.04 mol) | Unidain DS-403 (Daikin Kogyo) (100 ppm) | | Good surface accuracy Colorless Transparent | 1.61 | 42 |
| Example −6B | $(SCH_2CH_2NCO)_2$ (0.08 mol) | $C(CH_2SCH_2CH_2OH)_4$ (0.04 mol) | Unidain DS-401 (Daikin Kogyo) (100 ppm) Q2-120A (Dow Chem.) (100 ppm) | | Good surface accuracy Colorless Transparent | " | " |
| Example −7B | $(SCH_2CH_2NCO)_2$ (0.08 mol) | $C(CH_2SCH_2CH_2OH)_4$ (0.04 mol) | Dibutyl acid phosphate (500 ppm) | | Good surface accuracy Colorless Transparent | 1.60 | 43 |
| Example −8B | $(SCH_2CH_2NCO)_2$ (0.08 mol) | $(SCH_2CHCH_2OH)_2$<br>$\|$<br>OH<br>(0.04 mol) | Trimethyloctyl ammonium chloride (500 ppm) | | Good surface accuracy Colorless Transparent | 1.58 | 47 |
| Example −9B | $S(CH_2CH_2NCO)_2$ (0.04 mol) $(SCH_2CH_2NCO)_2$ (0.04 mol) | $C(CH_2SCH_2CH_2OH)_4$ (0.04 mol) | Diisopropyl acid phosphate (500 ppm) | | Good surface accuracy Colorless Transparent | 1.60 | 43 |
| Example −10B | $S(CH_2CH_2NCO)_2$ (0.08 mol) | $C(CH_2SCH_2CH_2OH)_4$ (0.02 mol)<br>$+SCH_2CHCH_2OH)_2$<br>$\|$<br>OH<br>(0.02 mol) | Diisopropyl acid phosphate (500 ppm) | | Good surface accuracy Colorless Transparent | 1.59 | 46 |
| Example −11B | $S(CH_2CH_2NCO)_2$ (0.04 mol) | $C(CH_2SCH_2CH_2OH)_4$ (0.02 mol) | Diisopropyl acid phosphate | | Good surface accuracy | 1.60 | 44 |

TABLE 2-continued

| | Polyisocyanate (amount) | Polyol (amount) | Internal releasing agent (amount) | Appearance | Mold release | Refractive index | Abbe's number |
|---|---|---|---|---|---|---|---|
| | | (SCH₂CHCH₂OH)₂ \| OH (0.02 mol) | (500 ppm) | Colorless Transparent | | | |
| Example -12B | OCN-C₆H₄-S-C₆H₄-NCO (0.01 mol) S(CH₂CH₂NCO)₂ (0.03 mol) | HOCH₂CH₂O-C₆H₄-C(S)₂-C₆H₄ (0.04 mol) | Diisopropyl acid phosphate (500 ppm) | Good surface accuracy Colorless Transparent | | 1.62 | 35 |
| Example -13B | OCN-C₆H₄-S-S-C₆H₄-NCO (0.01 mol) S(CH₂CH₂NCO)₂ (0.03 mol) | HO-C₆H₄-SO₂-C₆H₄-OH (0.01 mol) S(CH₂CH₂OH)₂ (0.03 mol) | Diisopropyl acid phosphate (500 ppm) | Good surface accuracy Colorless Transparent | | 1.61 | 34 |
| Example -14B | OCN-C₆H₄-SO₂-C₆H₄-NCO (0.01 mol) S(CH₂CH₂NCO)₂ (0.07 mol) | C(CH₂SCH₂CH₂OH)₄ (0.04 mol) | Diisopropyl acid phosphate (500 ppm) | Good surface accuracy Colorless Transparent | | 1.62 | 37 |
| Example -15B | OCN-C₆H₃(Me)-OSO₂-C₆H₄-NCO (0.01 mol) S(CH₂CH₂NCO)₂ (0.07 mol) | C(CH₂SCH₂CH₂OH)₄ (0.04 mol) | Diisopropyl acid phosphate (500 ppm) | Good surface accuracy Colorless Transparent | | 1.62 | 36 |

TABLE 2-continued

| | Polyisocyanate (amount) | Polyol (amount) | Internal releasing agent (amount) | Mold release | Appearance | Refractive index | Abbe's number |
|---|---|---|---|---|---|---|---|
| Example -16B | OCN—C₆H₃(Me)—NS(O)₂—C₆H₃(Me)—NCO (0.01 mol)<br>S(CH₂CH₂NCO)₂ (0.07 mol) | C(CH₂SCH₂CH₂OH)₄ (0.02 mol)<br>S(CH₂CHCH₂OH)₂<br>\|<br>OH<br>(0.02 mol) | Diisopropyl acid phosphate (500 ppm) | | Good surface accuracy Colorless Transparent | 1.60 | 38 |
| Example -17B | OCN—(thiophene)—NCO | C(CH₂SCH₂CH₂OH)₄ (0.02 mol)<br>S(CH₂CH₂OH)₂ (0.02 mol) | Diisopropyl acid phosphate (500 ppm) | | Good surface accuracy Colorless Transparent | 1.61 | 36 |

TABLE 3

| | Polyisocyanate (amount) | Polyol (amount) | Mold treatment | Mold release | Appearance | Refractive index | Abbe's number |
|---|---|---|---|---|---|---|---|
| Comparat. Example −1B | S(CH$_2$CH$_2$NCO)$_2$ (0.08 mol) | C(CH$_2$SCH$_2$CH$_2$OH)$_4$ (0.04 mol) | No treatment | X | — | — | — |
| Comparat. Example −2B | S(CH$_2$CH$_2$NCO)$_2$ (0.08 mol) | C(CH$_2$SCH$_2$CH$_2$OH)$_4$ (0.04 mol) | External releasing treatment | | Non uniformity of surface Colorless Treatment | 1.59 | 45 |
| Comparat. Example −3B | S(CH$_2$CH$_2$NCO)$_2$ (0.08 mol) | C(CH$_2$SCH$_2$CH$_2$OH)$_4$ (0.04 mol) | Recycled use (from Comparat. Example 2B) | X | — | — | — |
| Comparat. Example −4B | S(CH$_2$CH$_2$NCO)$_2$ (0.08 mol) | C(CH$_2$SCH$_2$CH$_2$OH)$_4$ (0.04 mol) | PP-mold | | Poor surface accuracy Colorless Transparent | 1.59 | 45 |
| Comparat. Example −5B | (SCH$_2$CH$_2$CH$_2$NCO)$_2$ (0.08 mol) | C(CH$_2$SCH$_2$CH$_2$OH)$_4$ (0.04 mol) | No treatment | X | — | — | — |
| Comparat. Example −6B | (SCH$_2$CH$_2$CH$_2$NCO)$_2$ (0.08 mol) | C(CH$_2$SCH$_2$CH$_2$OH)$_4$ (0.04 mol) | External releasing treatment | | Non uniformity of surface Colorless Transparent | 1.60 | 43 |
| Comparat. Example −7B | (SCH$_2$CH$_2$CH$_2$NCO)$_2$ (0.08 mol) | C(CH$_2$SCH$_2$CH$_2$OH)$_4$ (0.04 mol) | Recycled use (from Comparat. Example 6B) | X | — | — | — |
| Comparat. Example −8B | (SCH$_2$CH$_2$CH$_2$NCO)$_2$ (0.08 mol) | (SCH$_2$CHCH$_2$OH)$_2$ \| OH (0.04 mole) | PP-mold | | Poor surface accuracy Colorless Transparent | 1.58 | 47 |

What is claimed is:

1. A polyurethane base resin comprising reacting one or more of sulfur-containing polyisocyanate compounds with one or more of sulfur-containing polyol compounds.

2. A polyurethane base lens comprising a polyurethane base resin of claim 1.

3. A process for producing a polyurethane base lens comprising adding an internal mold releasing agent to a mixture of one or more of sulfur-containing polyisocyanate compounds and one or more of sulfur-containing polyol compounds followed by casting polymerization.

4. A polyurethane base lens produced by the process of claim 3.

5. The polyurethane base resin of claim 1 wherein the sulfur-containing polyisocyanate compounds are selected from the group consisting of sulfur-containing aliphatic polyisocyanate compounds, sulfide linkage containing aromatic polyisocyanate compounds, disulfide linkage containing aromatic polyisocyanate compounds, sulfone linkage containing aromatic polyisocyanate compounds, sulfonic acid ester linkage containing aromatic polyisocyanate compounds, sulfonamide linkage containing aromatic polyisocyanate compounds and sulfur-containing heterocyclic compounds.

6. The polyurethane base lens comprising the polyurethane base resin of claim 5.

7. The process of claim 3 wherein the sulfur containing polyisocyanate compounds are selected from the group consisting of sulfur-containing aliphatic polyisocyanate compounds, sulfide linkage containing aromatic polyisocyanate compounds, disulfide linkage containing aromatic polyisocyanate compounds, sulfone linkage containing aromatic polyisocyanate compounds, sulfonic acid ester linkage containing aromatic polyisocyanate compounds, sulfonamide linkage containing aromatic polyisocyanate compounds and sulfur-containing heterocyclic compounds.

8. The polyurethane base lens produced by the process of claim 7.

9. The polyurethane base resin of claim 1 wherein the sulfur-containing polyol compounds are selected from the group consisting of aliphatic polyol compounds having diphenyl-sulfide skeletons, sulfide linkage containing aliphatic polyol compounds, disulfide linkage containing aliphatic polyol compounds and phenolic hydroxyl group and sulfur-containing polyol compounds.

10. The polyurethane base lens comprising the polyurethane base resin of claim 9.

11. The process of claim 3 wherein the sulfur-containing polyol compounds are selected from the group consisting of aliphatic polyol compounds having diphenyl sulfide skeletons, sulfide linkage containing aliphatic polyol compounds, disulfide linkage containing aliphatic polyol compounds and phenolic hydroxyl group and sulfur-containing polyol compounds.

12. The polyurethane base lens produced by the process of claim 11.

13. The polyurethane base resin of claim 1 wherein the proportion of the polyisocyanate compound to the polyol compound is a mole ratio of from about 0.5 to about 3.0 moles of functional isocyanate group per mole of hydroxyl group.

14. The polyurethane base lens comprising the polyurethane base resin of claim 13.

15. The process of claim 3 wherein the proportion of the polyisocyanate compound to the polyol compound is a mole ratio of from about 0.5 to about 3.0 moles of functional isocyanate group per mole of hydroxyl group.

16. The polyurethane base lens produced by the process of claim 15.

17. The process of claim 3 wherein the internal mold releasing agent is a fluorine containing nonionic surface active agent.

18. The process of claim 3 wherein the internal mold releasing agent is a silicon containing nonionic surface active agent.

19. The process of claim 3 wherein the internal mold releasing agent is an alkyl quaternary ammonium salt.

20. The process of claim 3 wherein the internal mold releasing agent is an acid phosphate ester.

21. The polyurethane base lens produced by the process of claim 17.

22. The polyurethane base lens produced by the process of claim 18.

23. The polyurethane base lens produced by the process of claim 19.

24. The polyurethane base lens produced by the process of claim 20.

25. The process of claim 3 wherein the internal mold releasing agent is present in an amount of from about 0.1 to about 10,000 ppm per sum of the polyisocyanate compound and the polyol compound.

26. The polyurethane base lens produced by the process of claim 25.

27. The process of claim 3 wherein casting polymerization is carried out at a temperature of from about $-20°$ C. to about $200°$ C.

* * * * *